(12) United States Patent
Ragupathi et al.

(10) Patent No.: US 10,126,798 B2
(45) Date of Patent: Nov. 13, 2018

(54) SYSTEMS AND METHODS FOR AUTONOMOUSLY ADAPTING POWERING BUDGETING IN A MULTI-INFORMATION HANDLING SYSTEM PASSIVE CHASSIS ENVIRONMENT

(71) Applicant: Dell Products L.P., Round Rock, TX (US)

(72) Inventors: Dinesh Kunnathur Ragupathi, Round Rock, TX (US); Venkatesh Ramamoorthy, Round Rock, TX (US); Arun Muthaiyan, Round Rock, TX (US); Yogesh Prabhakar Kulkarni, Round Rock, TX (US); Balaji Bapu Gururaja Rao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 15/160,147

(22) Filed: May 20, 2016

(65) Prior Publication Data

US 2017/0336856 A1 Nov. 23, 2017

(51) Int. Cl.
*G06F 1/26* (2006.01)
*G06F 1/32* (2006.01)
*G06F 9/50* (2006.01)

(52) U.S. Cl.
CPC ............ *G06F 1/266* (2013.01); *G06F 1/3234* (2013.01); *G06F 9/5094* (2013.01); *G06F 1/3203* (2013.01)

(58) Field of Classification Search
CPC ........... G06F 1/3296; G06F 1/266; G06F 1/28

USPC ........................................................ 713/320
See application file for complete search history.

(56) References Cited

U.S. PATENT DOCUMENTS

| | | | | |
|---|---|---|---|---|
| 9,250,684 | B1* | 2/2016 | Chen ..................... | G06F 1/3206 |
| 2008/0222435 | A1* | 9/2008 | Bolan ................... | G06F 1/3203 713/310 |
| 2009/0125737 | A1* | 5/2009 | Brey ..................... | G06F 1/3203 713/322 |
| 2011/0289327 | A1* | 11/2011 | Nolterieke ................ | G06F 1/26 713/300 |
| 2012/0192007 | A1* | 7/2012 | Weilnau, Jr. ............. | G06F 1/30 714/14 |

(Continued)

*Primary Examiner* — Jaweed A Abbaszadeh
*Assistant Examiner* — Volvick Derose
(74) *Attorney, Agent, or Firm* — Jackson Walker L.L.P.

(57) ABSTRACT

An information handling system may include a processor, and a host management controller communicatively coupled to the processor and configured to communicate with a chassis controller of a chassis in which the information handling system is received to determine a host baseline power threshold for the information handling system and a tenant baseline power threshold for a tenant comprising the information handling system and at least one other information handling system received in the chassis, monitor a power consumption of the information handling system and a cumulative power consumption of the information handling system and the at least one other information handling system, and adapt a host dynamic power limit defining a maximum amount of power consumption for the information handling system based on the power consumption of the information handling system, the cumulative power consumption, the host baseline power threshold, and the tenant baseline power threshold.

21 Claims, 4 Drawing Sheets

(56) References Cited

U.S. PATENT DOCUMENTS

| | | | | |
|---|---|---|---|---|
| 2013/0226362 A1* | 8/2013 | Jagadishprasad | ..... | G06F 9/5094 700/297 |
| 2014/0359310 A1* | 12/2014 | Haridass | ...... | G06F 9/5094 713/300 |
| 2015/0177814 A1* | 6/2015 | Bailey | ...... | G06F 1/3234 713/320 |
| 2015/0331703 A1* | 11/2015 | Kelly | ...... | G06F 9/45558 718/1 |
| 2016/0011914 A1* | 1/2016 | Bohn | ...... | G06F 9/5094 713/300 |
| 2016/0073543 A1* | 3/2016 | VanNess | ...... | G06F 1/3287 361/679.02 |

* cited by examiner

FIG. 4

| ITERATION | | INFORMATION HANDLING SYSTEM A | | INFORMATION HANDLING SYSTEM B | | INFORMATION HANDLING SYSTEM C | | INFORMATION HANDLING SYSTEM D | | TENANT | |
|---|---|---|---|---|---|---|---|---|---|---|---|
| ITERATION | | POWER CONSUMPTION (W) | HOST DYNAMIC POWER LIMIT (W) | POWER CONSUMPTION (W) | HOST DYNAMIC POWER LIMIT (W) | POWER CONSUMPTION (W) | HOST DYNAMIC POWER LIMIT (W) | POWER CONSUMPTION (W) | HOST DYNAMIC POWER LIMIT (W) | CUMULATIVE POWER CONSUMPTION (W) | CUMULATIVE HOST POWER LIMIT (W) |
| 0 | | 220 | 240 | 130 | 150 | 150 | 170 | 140 | 160 | 640 | 720 |
| 1 | | 233 | 260 | 133 | 150 | 169 | 190 | 155 | 180 | 690 | 180 |
| 2 | | 258 | 240 | 135 | 150 | 175 | 190 | 160 | 180 | 726 | 760 |
| 3 | | 239 | 220 | 145 | 170 | 180 | 190 | 171 | 200 | 735 | 780 |
| 4 | | 219 | 200 | 169 | 190 | 190 | 200 | 199 | 200 | 777 | 790 |
| 5 | | 199 | 200 | 189 | 200 | 199 | 200 | 199 | 200 | 786 | 800 |
| 6 | | 200 | 200 | 200 | 200 | 200 | 200 | 200 | 200 | 800 | 800 |
| ○ ○ ○ | | ○ ○ ○ | ○ ○ ○ | ○ ○ ○ | ○ ○ ○ | ○ ○ ○ | ○ ○ ○ | ○ ○ ○ | ○ ○ ○ | ○ ○ ○ | ○ ○ ○ |
| n | | 200 | 220 | 100 | 180 | 180 | 200 | 165 | 180 | 645 | 780 |
| n+1 | | 215 | 240 | 100 | 160 | 180 | 200 | 165 | 180 | 660 | 780 |
| n+2 | | 233 | 260 | 100 | 140 | 180 | 200 | 165 | 180 | 678 | 780 |

400

SYSTEMS AND METHODS FOR AUTONOMOUSLY ADAPTING POWERING BUDGETING IN A MULTI-INFORMATION HANDLING SYSTEM PASSIVE CHASSIS ENVIRONMENT

TECHNICAL FIELD

The present disclosure relates in general to information handling systems, and more particularly to systems and methods for autonomously controlling power budgets of individual modular information handling systems in a chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are being utilized in architectures including a system chassis with multiple modular information handling systems received therein and with a shared infrastructure of various peripheral and input/output capabilities common to the chassis as a whole which may be shared by the multiple modular information handling systems.

To manage power consumption of information handling systems, power limits or "caps" are often applied to information handling systems, limiting the amount of power they may consume, in order to facilitate sharing of available power to a system, as well as for thermal control of an information handling system. In a "passive" chassis environment, a chassis may not have a chassis-level controller capable of sophisticated power control of individual information handling systems disposed in the chassis. Accordingly, in traditional approaches, an overall chassis power limit may be equally divided among individual information handling systems received in a chassis, and each individual information handling system may then control its own power consumption so as to not exceed its fixed share of the overall chassis limit. However, there are numerous disadvantages to such approach. For example, there may exist times when one or more information handling systems only require a small percentage of their respective power limits, while others might be operating at or near their respective power limits, and may be throttled despite the chassis having surplus power.

SUMMARY

In accordance with the teachings of the present disclosure, the disadvantages and problems associated with power management of modular information handling systems in a chassis may be reduced or eliminated.

In accordance with embodiments of the present disclosure, an information handling system may include a processor, and a host management controller communicatively coupled to the processor and configured to communicate with a chassis controller of a chassis in which the information handling system is received to determine a host baseline power threshold for the information handling system and a tenant baseline power threshold for a tenant comprising the information handling system and at least one other information handling system received in the chassis, monitor a power consumption of the information handling system and a cumulative power consumption of the information handling system and the at least one other information handling system, and adapt a host dynamic power limit defining a maximum amount of power consumption for the information handling system based on the power consumption of the information handling system, the cumulative power consumption, the host baseline power threshold, and the tenant baseline power threshold.

In accordance with these and other embodiments of the present disclosure, a method may include communicating with a chassis controller of a chassis in which an information handling system is received to determine a host baseline power threshold for the information handling system and a tenant baseline power threshold for a tenant comprising the information handling system and at least one other information handling system received in the chassis, monitoring a power consumption of the information handling system and a cumulative power consumption of the information handling system and the at least one other information handling system, and adapting a host dynamic power limit defining a maximum amount of power consumption for the information handling system based on the power consumption of the information handling system, the cumulative power consumption, the host baseline power threshold, and the tenant baseline power threshold.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to communicate with a chassis controller of a chassis in which an information handling system is received to determine a host baseline power threshold for the information handling system and a tenant baseline power threshold for a tenant comprising the information handling system and at least one other information handling system received in the chassis, monitor a power consumption of the information handling system and a cumulative power consumption of the information handling system and the at least one other information handling system, and adapt a host dynamic power limit defining a maximum amount of power consumption for the information handling system based on the power consumption of the information handling system, the cumulative power consumption, the host baseline power threshold, and the tenant baseline power threshold.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates an example table depicting power management parameters of information handling systems of a tenant at various times, in accordance with embodiments of the present disclosure.

DETAILED DESCRIPTION

Figure 1:
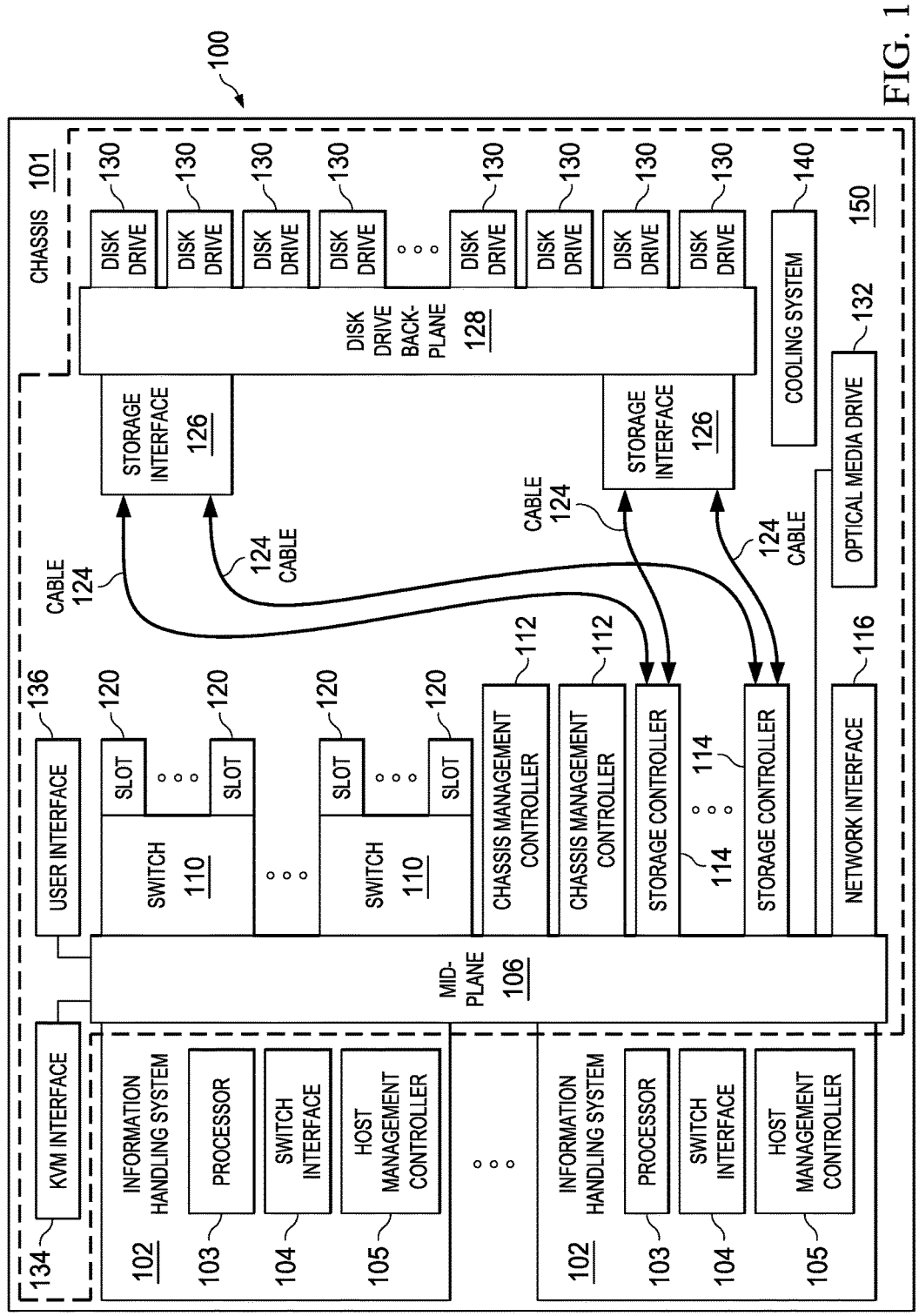
FIG. 1 illustrates a block diagram of an example system chassis with multiple information handling systems and with various shared infrastructure peripheral and I/O capabilities common to the chassis as a whole, in accordance with embodiments of the present disclosure.

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with a shared infrastructure various peripheral and I/O capabilities common to chassis 101 as a whole, in accordance with embodiments of the present disclosure. As depicted in FIG. 1, system 100 may comprise a chassis 101 including a plurality of information handling systems 102, a mid-plane 106, one or more switches 110, a chassis controller 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, a user interface 136, and a cooling system 140.

An information handling system 102 may generally be operable to receive data from and/or communicate data to one or more disk drives 130 and/or other information handling resources of chassis 101 via mid-plane 106 and/or switches 110. In certain embodiments, an information handling system 102 may be a server. In such embodiments, an information handling system 102 may comprise a blade server having modular physical design. In these and other embodiments, an information handling system 102 may comprise an M class server. As depicted in FIG. 1, an information handling system 102 may include a processor 103, one or more switch interfaces 104 communicatively coupled to processor 103, and a host management controller 105 communicatively coupled to processor 103.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a disk drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 104 for redundancy, high availability, and/or other reasons.

A host management controller 105 may be implemented by, for example, a microprocessor, microcontroller, DSP, ASIC, EEPROM, or any combination thereof. Host management controller 105 may be configured to communicate with one or more of chassis controllers 112 via midplane 106 (e.g., via an Ethernet management fabric). Host management controller 105 may be configured to provide out-of-band management facilities for management of information handling system 102. Such management may be made by elements of chassis 101 even if information handling system 102 is powered off or powered to a standby state. Host management controller 105 may include a processor, memory, and network connection separate from the rest of information handling system 102. In certain embodiments, host management controller 105 may include or may be an integral part of a baseboard management controller (BMC), Dell Remote Access Controller (DRAC) or an Integrated Dell Remote Access Controller (iDRAC).

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis controller 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

Chassis controller 112 may be any system, device, or apparatus configured to facilitate management and/or control of system 100, its information handling systems 102, and/or one or more of its component information handling resources. Chassis controller 112 may be configured to issue commands and/or other signals to manage and/or control information handling system 102 and/or information handling resources of system 100. Chassis controller 112 may comprise a microprocessor, microcontroller, DSP, ASIC, field programmable gate array ("FPGA"), EEPROM, or any combination thereof. As shown in FIG. 1, chassis controller 112 may be coupled to mid-plane 106. In some embodiments, a chassis controller 112 may provide a user interface and high level controls for management of switches 110, including configuring assignments of individual information handling systems 102 to non-shared information handling resources of system 100. In these and other embodiments, a chassis controller 112 may define configurations of the storage subsystem (e.g., storage controllers 114, storage interfaces 126, disk drives 130, etc.) of system 100. For example, a chassis controller 112 may provide physical function configuration and status information that would normally occur at the driver level in traditional server implementations. Examples of physical functions include disk drive discovery and status, RAID configuration, and logical volume mapping.

In addition or alternatively, a chassis controller 112 may also provide a management console for user/administrator access to these functions. For example, a chassis management controller 112 may implement Web Services Management ("WS-MAN") or another suitable management protocol permitting a user to remotely access a chassis controller 112 to configure system 100 and its various information handling resources. In such embodiments, a chassis controller 112 may interface with a network interface separate from network interface 116, thus allowing for "out-of-band" control of system 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis controller 112. In the same or alternative embodiments, chassis controller 112 may allow an administrator to remotely manage one or more parameters associated with operation of system 100 and its various information handling resources (e.g., power usage, processor allocation, memory allocation, security privileges, etc.). A chassis controller 112 may also be known as a chassis management controller or a satellite controller.

A storage controller 114 may include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), I/O routing, and error detection and recovery. As shown in FIG. 1, a storage controller 114 may be coupled to a connector on a switch 110. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically couple such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low profile slot to mid-plane 106, a switch 110, or another component, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or another suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface 126 may serve to permit a relatively small number of communication links (e.g., two) between storage controllers 114 and storage interfaces 126 to communicate with a greater number (e.g., 25) of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a disk drive backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives 130 may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as a switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

Cooling system 140 may comprise any system, device, or apparatus for cooling components of chassis 101. For example, cooling system 140 may comprise air movers (e.g., fans or blowers) for causing a cooling air flow over components of chassis 101, a liquid coolant conveyance network for distributing a cooling liquid to components of chassis 101, and/or any other system suitable for cooling components of chassis 101. In some embodiments, such cooling system may also include sensors (e.g., temperature sensors) and/or control logic for controlling operational parameters (e.g., rotational speeds of motors of air movers) of cooling system 140.

Figure 2:
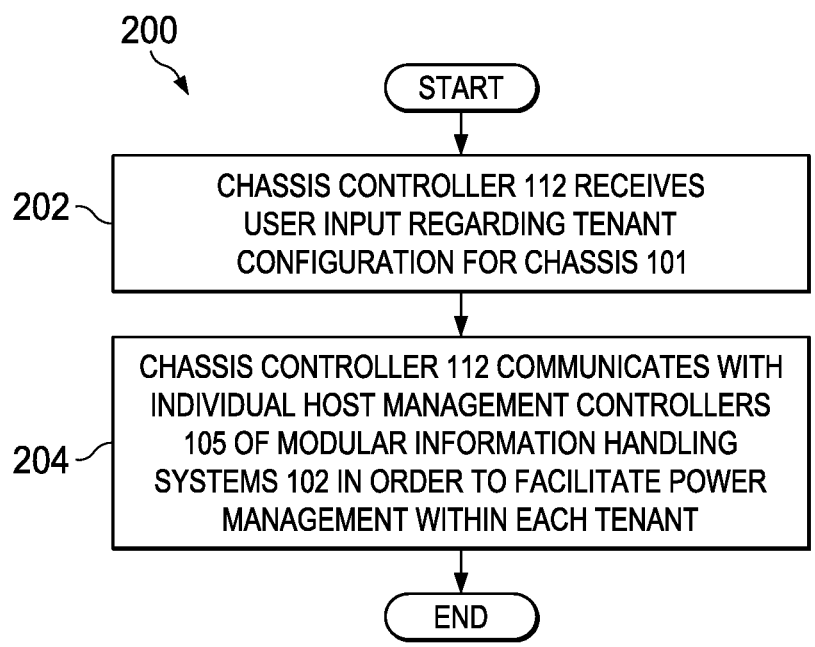
FIG. 2 illustrates a flow chart of an example method for multitenant power negotiation in a chassis comprising modular information handling systems, in accordance with embodiments of the present disclosure.

FIG. 2 illustrates a flow chart of an example method 200 for multitenant power negotiation in a chassis comprising modular information handling systems, in accordance with embodiments of the present disclosure. According to certain embodiments, method 200 may begin at step 202. As noted above, teachings of the present disclosure may be implemented in a variety of configurations of system 100 as shown in FIG. 1. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, chassis controller 112 may receive user input (e.g., via user interface 134) regarding a tenant configuration for chassis 101. A tenant configuration may include identities of one or more tenants, information handling systems 102 which are members of each tenant (e.g., such that each information handling system 102 is assigned to no more than one tenant), and a power limit for each tenant. At step 204, chassis controller 112 may communicate with individual host management controllers 105 of modular information handling systems 102 in order to facilitate, as described in greater detail below, power management within each tenant such that the member information handling systems 102 of a tenant do not, in the aggregate, exceed the power limit for such tenant.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 100, components thereof, or any other system such as those shown in FIG. 1 operable to implement method 200. In certain embodiments, method 200 may be implemented partially or fully in software and/or firmware embodied in computer-readable media.

Figure 3:
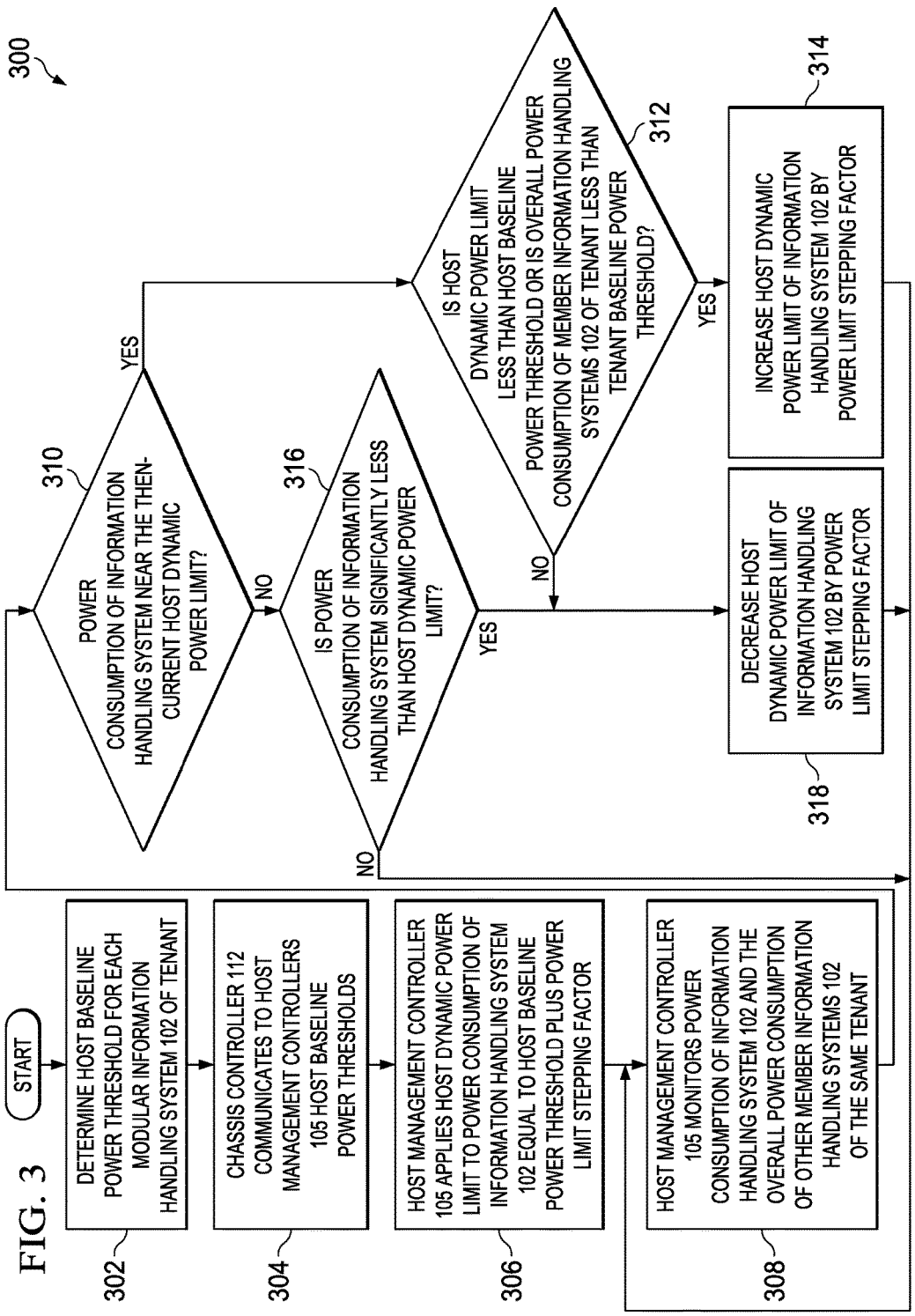
FIG. 3 illustrates a flow chart of an example method for power management in a tenant comprising modular information handling systems, in accordance with embodiments of the present disclosure.

FIG. 3 illustrates a flow chart of an example method 300 for power management within a tenant, in accordance with embodiments of the present disclosure. According to certain embodiments, method 300 may begin at step 302. As noted above, teachings of the present disclosure may be implemented in a variety of configurations of system 100 as shown in FIG. 1. As such, the preferred initialization point for method 300 and the order of the steps comprising method 300 may depend on the implementation chosen. In these and other embodiments, method 300 may be implemented as firmware, software, applications, functions, libraries, or other instructions.

At step 302, for each tenant within chassis 101, chassis controller 112 may determine for each modular information handling system 102 which is a member of the tenant a host baseline power threshold. In some embodiments, such host baseline power threshold may be calculated by dividing the tenant power limit by the number of member information handling system 102 of such tenant, such that each member information handling system 102 of such tenant has an equal host baseline power threshold. In other embodiments, such host baseline power threshold for each member information handling system 102 of such tenant may be calculated in accordance with a predetermined weight associated with each individual member information handling system 102 (e.g., a user/administrator of system 100 may assign differing weights to each member information handling system 102 of a tenant, and each host baseline power threshold may be allocated in accordance with such weights). At step 304, chassis controller 112 may communicate to host management controller 105 of each information handling system 102 its respective host baseline power threshold.

At step 306, each host management controller 105 may apply a host dynamic power limit to power consumption of its associated information handling system 102 such that the host dynamic power limit is equal to its host baseline power threshold plus a power limit stepping factor. For example, a host baseline power threshold for an information handling system 102 may be equal to 200 watts, and a power limit stepping factor for such information handling system 102 (and, in some cases, the power limit stepping factor for other information handling systems 102 of the same tenant) may be equal to 20 watts.

At step 308, each host management controller 105 may monitor the power consumption of its associated information handling system 102 and the overall power consumption of other member information handling systems 102 of the same tenant.

At step 310, a host management controller 105 may compare the power consumption of its associated information handling system 102 to an amount based on the then-current host dynamic power limit for the information handling system 102 and the power limit stepping factor, to determine if the power consumption is near the then-current host dynamic power limit. For example, in some embodiments, the comparison may comprise determining whether the power consumption is greater than a difference between the then-current host dynamic power limit and the quantity of the power limit stepping factor divided by a constant, such as 2 (e.g., is power consumption>host dynamic power limit—power limit stepping factor/2?). If the comparison indicates that the power consumption is near the then-current host dynamic power limit, method 300 may proceed to step 312. Otherwise, method 300 may proceed to step 316.

At step 312, in response to the power consumption being near the host dynamic power limit, the host management controller 105 may determine if the host dynamic power limit is less than the host baseline power threshold for its associated information handling system or if the overall power consumption of member information handling systems 102 of the same tenant is less than a tenant baseline power threshold. The tenant baseline power threshold may be any suitable threshold amount which is less than the tenant power limit. For example, in some embodiments, the tenant baseline power threshold may be equal to the tenant power limit minus the quantity of the number of member information handling systems 102 in the tenant multiplied by the power limit stepping factor (e.g., tenant baseline power threshold=tenant power limit−(# of members in tenant×power limit stepping factor)). If the host dynamic power limit is less than the host baseline power threshold for its associated information handling system or if the overall power consumption of member information handling systems 102 of the same tenant is less than the tenant baseline power threshold, method 300 may proceed to step 314. Otherwise, method 300 may proceed to step 318.

At step 314, in response to the host dynamic power limit being less than the host baseline power threshold for its associated information handling system or the overall power consumption of member information handling systems 102 of the same tenant being less than the tenant baseline power threshold, host management controller 105 may increase the host dynamic power limit of its associated information handling system 102 by the power limit stepping factor. After completion of step 314, method 300 may proceed again to step 308.

At step 316, in response to determining that the power consumption of an information handling system 102 is not near the then-current host dynamic power limit of such information handling system 102, host management controller 105 may determine if the power consumption of the information handling system is significantly less than its then-current host dynamic power limit. For example, in some embodiments, the power consumption may be determined to be significantly less than the then-current host dynamic power limit of an information handling system when the power consumption is less than a difference between the then-current host dynamic power limit and the quantity of the power limit stepping factor multiplied by a constant, such as 1.5 (e.g., is power consumption<host dynamic power limit−power limit stepping factor×1.5?). If the comparison indicates that the power consumption is significantly less than the then-current host dynamic power limit, method 300 may proceed to step 312. Otherwise, method 300 may proceed to step 318. Otherwise, method 300 may proceed again to step 308.

At step 318, host management controller 105 may decrease the host dynamic power limit of its associated information handling system 102 by the power limit stepping factor. After completion of step 318, method 300 may proceed again to step 308.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 100, components thereof, or any other system such as those shown in FIG. 1 operable to implement method 300. In certain embodiments, method 300 may be implemented partially or fully in software and/or firmware embodied in computer-readable media.

To illustrate operation of method 300, reference is made to FIG. 4. FIG. 4 illustrates an example table 400 depicting power management parameters of information handling systems of a tenant at various times, in accordance with embodiments of the present disclosure. Each time interval shown in table 400 may represent values of power parameters determined by a corresponding interaction of steps 308-318 of method 300. In this example, it is assumed that a tenant power limit comprising four information handling systems 102 is 800 W. Accordingly, if equal weights are given to each information handling system, the host baseline power threshold for each information handling system is 200 W. Assuming a power limit stepping factor of 20 W, the tenant baseline power threshold for the tenant may be 720 W (e.g., 800 W−4×20 W). Initially, at a time interval 0, individual power consumptions of information handling systems 102 of the tenant are 220 W, 130 W, 150 W and 140 W, respectively, and their host dynamic power limits may be set to 240 W, 150 W, 170 W, and 160 W respectively (e.g., host dynamic power limit=power consumption+power limit stepping factor). At interval 1, power consumptions of individual information handling systems 102 may change, and host dynamic power limits may change in response thereto. For example, for information handling system 1 of table 400, its new power consumption is near the host dynamic power limit at interval 0, but the cumulative power consumption for the tenant is below the tenant baseline power threshold, and thus, information handling system 1 may increase its host dynamic power limit by the power limit stepping factor. Similarly, host dynamic power limits of information handling systems 3 and 4 may also change in response to the increase in consumption.

At interval 2, power consumptions of information handling systems 1, 3, and 4 increase, which results in a cumulative power consumption of 726 W, which is above the tenant baseline power threshold of 720 W, which may cause host dynamic power limit for information handling system 1 to decrease by the power limit stepping factor. Therefore, information handling system 1 is prevented from overconsuming and allows other information handling systems of the tenant to operate within their limits without any power limiting.

At interval 3, power consumptions of information handling systems 2, 3, and 4 increase, which again results in a cumulative power consumption of 735 W, which is again above the tenant baseline power threshold of 720 W, and which again may cause host dynamic power limit for information handling system 1 to decrease by the power limit stepping factor. At intervals 4, 5, and 6, power consumptions of information handling systems 2, 3, and 4 increase, forcing all information handling systems to set host dynamic power limits such that the sum of host dynamic power limits (800 W) equals the tenant power limit. At later intervals (e.g., n, n+1, n+2), decreases in power consumptions of information handling systems 2, 3, and 4 occur, allowing the host dynamic power limit for information handling system 1 to increase again.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a host management controller communicatively coupled to the processor and configured to:
   communicate with a chassis controller of a chassis in which the information handling system is received to determine a host baseline power threshold for the information handling system, a tenant baseline power threshold for a tenant comprising the information handling system and at least one other information handling system received in the chassis, and a power limit stepping factor for the tenant, wherein the tenant baseline power threshold is equal to a tenant power limit indicative of a maximum amount of power that is available to the tenant minus the power limit stepping factor for the tenant;
   monitor a power consumption of the information handling system and a cumulative power consumption of the information handling system and the at least one other information handling system; and
   adapt a host dynamic power limit defining a maximum amount of power consumption for the information handling system based on the power consumption of the information handling system, the cumulative power consumption, the host baseline power threshold, the tenant baseline power threshold, and the power limit stepping factor for the tenant.

2. The information handling system of claim 1, wherein each of the information handling system and the at least one other information handling system have equal host baseline power thresholds.

3. The information handling system of claim 1, wherein at least two of the information handling system and the at least one other information handling system have different host baseline power thresholds.

4. The information handling system of claim 1, wherein the controller is configured to adapt the host dynamic power limit by increasing the host dynamic power limit responsive to:
   the power consumption of the information handling system being near the host dynamic power limit; and
   the host dynamic power limit being less than the host baseline power threshold.

5. The information handling system of claim 1, wherein the controller is configured to adapt the host dynamic power limit by increasing the host dynamic power limit responsive to:
   the power consumption of the information handling system being near the host dynamic power limit; and
   the cumulative power consumption being less than the tenant baseline power threshold.

6. The information handling system of claim 1, wherein the controller is configured to adapt the host dynamic power limit by decreasing the host dynamic power limit responsive to:
   the power consumption of the information handling system being near the host dynamic power limit;
   the host dynamic power limit being more than the host baseline power threshold; and
   the cumulative power consumption being more than the tenant baseline power threshold.

7. The information handling system of claim 1, wherein the controller is configured to adapt the host dynamic power limit by decreasing the host dynamic power limit responsive to the power consumption of the information handling system being significantly less than the host dynamic power limit.

8. A method comprising:
   communicating with a chassis controller of a chassis in which an information handling system is received to determine a host baseline power threshold for the information handling system, a tenant baseline power threshold for a tenant comprising the information handling system and at least one other information handling system received in the chassis, and a power limit stepping factor for the tenant, wherein the tenant baseline power threshold is equal to a tenant power limit indicative of a maximum amount of power that is available to the tenant minus the power limit stepping factor for the tenant;

monitoring a power consumption of the information handling system and a cumulative power consumption of the information handling system and the at least one other information handling system; and adapting a host dynamic power limit defining a maximum amount of power consumption for the information handling system based on the power consumption of the information handling system, the cumulative power consumption, the host baseline power threshold, the tenant baseline power threshold, and the power limit stepping factor for the tenant.

9. The method of claim 8, wherein each of the information handling system and the at least one other information handling system have equal host baseline power thresholds.

10. The method of claim 8, wherein at least two of the information handling system and the at least one other information handling system have different host baseline power thresholds.

11. The method of claim 8, further comprising adapting the host dynamic power limit by increasing the host dynamic power limit responsive to:
   the power consumption of the information handling system being near the host dynamic power limit; and
   the host dynamic power limit being less than the host baseline power threshold.

12. The method of claim 8, further comprising adapting the host dynamic power limit by increasing the host dynamic power limit responsive to:
   the power consumption of the information handling system being near the host dynamic power limit; and
   the cumulative power consumption being less than the tenant baseline power threshold.

13. The method of claim 8, further comprising adapting the host dynamic power limit by decreasing the host dynamic power limit responsive to:
   the power consumption of the information handling system being near the host dynamic power limit;
   the host dynamic power limit being more than the host baseline power threshold; and
   the cumulative power consumption being more than the tenant baseline power threshold.

14. The method of claim 8, further comprising adapting the host dynamic power limit by decreasing the host dynamic power limit responsive to the power consumption of the information handling system being significantly less than the host dynamic power limit.

15. An article of manufacture comprising:
a non-transitory computer readable medium; and
computer-executable instructions carried on the computer readable medium, the instructions readable by a processor, the instructions, when read and executed, for causing the processor to:
   communicate with a chassis controller of a chassis in which an information handling system is received to determine a host baseline power threshold for the information handling system, a tenant baseline power threshold for a tenant comprising the information handling system and at least one other information handling system received in the chassis, and a power limit stepping factor for the tenant, wherein the tenant baseline power threshold is equal to a tenant power limit indicative of a maximum amount of power that is available to the tenant minus the power limit stepping factor for the tenant;
   monitor a power consumption of the information handling system and a cumulative power consumption of the information handling system and the at least one other information handling system; and
   adapt a host dynamic power limit defining a maximum amount of power consumption for the information handling system based on the power consumption of the information handling system, the cumulative power consumption, the host baseline power threshold, the tenant baseline power threshold, and the power limit stepping factor for the tenant.

16. The article of claim 15, wherein each of the information handling system and the at least one other information handling system have equal host baseline power thresholds.

17. The article of claim 15, wherein at least two of the information handling system and the at least one other information handling system have different host baseline power thresholds.

18. The article of claim 15, the instructions for further causing the processor to adapt the host dynamic power limit by increasing the host dynamic power limit responsive to:
   the power consumption of the information handling system being near the host dynamic power limit; and
   the host dynamic power limit being less than the host baseline power threshold.

19. The article of claim 15, the instructions for further causing the processor to adapt the host dynamic power limit by increasing the host dynamic power limit responsive to:
   the power consumption of the information handling system being near the host dynamic power limit; and
   the cumulative power consumption being less than the tenant baseline power threshold.

20. The article of claim 15, the instructions for further causing the processor to adapt the host dynamic power limit by decreasing the host dynamic power limit responsive to:
   the power consumption of the information handling system being near the host dynamic power limit;
   the host dynamic power limit being more than the host baseline power threshold; and
   the cumulative power consumption being more than the tenant baseline power threshold.

21. The article of claim 15, the instructions for further causing the processor to adapt the host dynamic power limit by decreasing the host dynamic power limit responsive to the power consumption of the information handling system being significantly less than the host dynamic power limit.

* * * * *